(12) United States Patent
Mishima et al.

(10) Patent No.: US 8,686,667 B2
(45) Date of Patent: Apr. 1, 2014

(54) LIGHTING POWER SOURCE WITH CONTROLLED CHARGING OPERATION FOR DRIVING CAPACITOR

(75) Inventors: Masanori Mishima, Souraku (JP); Katunobu Hamamoto, Neyagawa (JP)

(73) Assignee: Panasonic Corporation, Osaka (JP)

( * ) Notice: Subject to any disclaimer, the term of this patent is extended or adjusted under 35 U.S.C. 154(b) by 663 days.

(21) Appl. No.: 13/013,999

(22) Filed: Jan. 26, 2011

(65) Prior Publication Data

US 2011/0193495 A1  Aug. 11, 2011

(30) Foreign Application Priority Data

Jan. 26, 2010 (JP) ................. 2010-014772
Jan. 26, 2010 (JP) ................. 2010-014773
Jan. 26, 2010 (JP) ................. 2010-014774

(51) Int. Cl.
*H05B 37/02* (2006.01)
*H05B 39/04* (2006.01)
*H05B 41/36* (2006.01)
*G05F 1/00* (2006.01)
*H05B 41/16* (2006.01)
*H05B 41/24* (2006.01)

(52) U.S. Cl.
USPC ........... 315/307; 315/210; 315/226; 315/246; 315/297

(58) Field of Classification Search
None
See application file for complete search history.

(56) References Cited

U.S. PATENT DOCUMENTS

2004/0113570 A1* 6/2004 Ribarich et al. .............. 315/307
2009/0302775 A1* 12/2009 Alexandrov ................. 315/224

FOREIGN PATENT DOCUMENTS

JP  2004-354783  6/2002

* cited by examiner

*Primary Examiner* — Douglas W Owens
*Assistant Examiner* — Dedei K Hammond
(74) *Attorney, Agent, or Firm* — Waddey Patterson; Mark J. Patterson; Gary L. Montle (57) ABSTRACT

A lighting power source provides AC or DC power as needed to power an electric light source. A first switching element and a diode are coupled in series across output ends of a DC power source, with a second switching element coupled across the diode. An inductor forms an output loop with the diode. A driving capacitor has a first end coupled to a node between the first switching element and the diode. A charging power source is coupled to a second end of the driving capacitor and supplied with power from the DC power source. During a charging operation, a control circuit charges the driving capacitor by turning on the second switching element while maintaining the first switching element in an OFF state. During a normal operation which follows the charging operation the control circuit repeatedly turns on/off the first switching element while maintaining the second switching element in the OFF state.

20 Claims, 8 Drawing Sheets

LIGHTING POWER SOURCE WITH CONTROLLED CHARGING OPERATION FOR DRIVING CAPACITOR

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent applications which are hereby incorporated by reference: Japan Patent Application No. 2010-014772, filed Jan. 26, 2010; Japan Patent Application No. 2010-014773, filed Jan. 26, 2010; and Japan Patent Application No. 2010-014774, filed Jan. 26, 2010.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to a lighting power source and a light fixture for powering one or more lamps or light sources such as a light emitting diode (LED). More particularly, the present invention relates to a lighting power source having control circuitry for reducing the charging time in a driving capacitor, and an associated light fixture for mounting the lighting power source.

Figure 14:
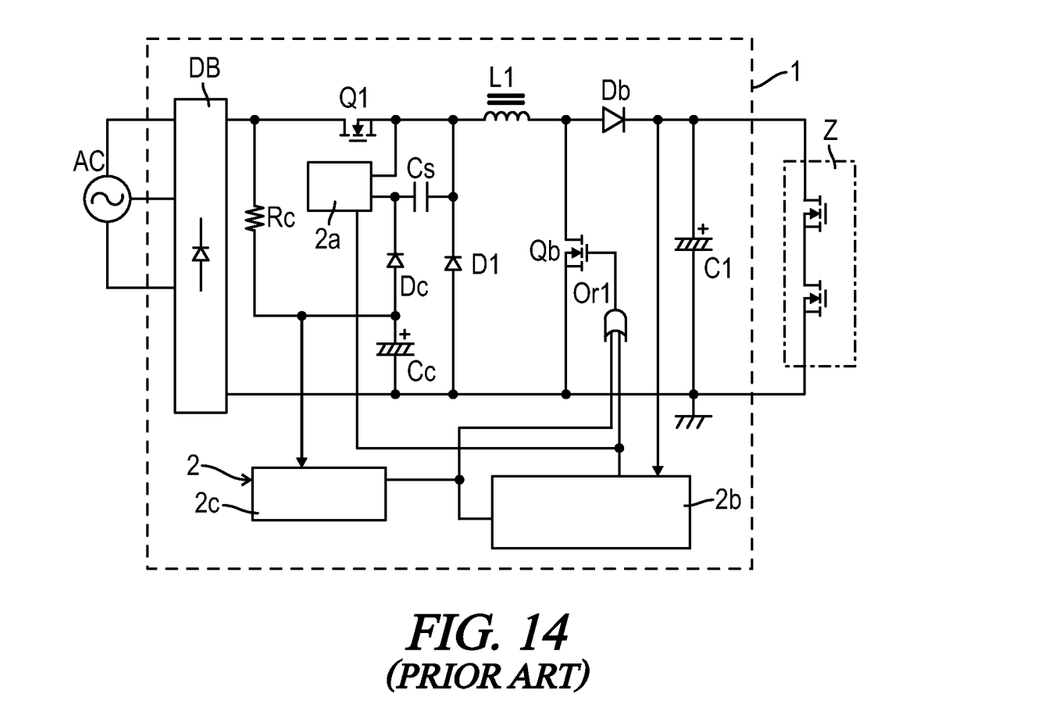
FIG. 14 is a circuit block diagram representing a lighting power source as previously known in the art.

An example of a lighting power source as conventionally known in the art is as shown in FIG. 14. A diode bridge DB is provided as a DC power source that outputs pulsating DC power) by full-wave rectifying an AC power input from an AC power source AC. A first switching element Q1 (e.g., an N-channel type MOSFET) is connected at a first end to a high voltage output side of the diode bridge DB. A diode D1 is connected across the output ends of the diode bridge DB, with its anode coupled to the low voltage output side and its cathode coupled to high voltage side opposite the first switching element Q1. An output circuit includes an inductor L1 forming a loop in conjunction with the diode D1 and to which a load Z is connected. A control circuit 2 is provided which is effective to turn on/off the first switching element Q1.

In the conventional lighting power source 1 as shown in FIG. 14, the output circuit is a boost converter (a step-up chopper circuit) including a series circuit of the inductor L1 and a step-up switching element Qb that is connected in parallel with diode D1, and a series circuit of a step-up diode Db and a capacitor C1 that is connected in parallel with the step-up switching element Qb. More specifically, both ends of the capacitor C1 are connected as outputs to load Z, and DC power across the capacitor C1 is output to the load Z. The first switching element Q1, the diode D1, the inductor L1 and the capacitor C1 collectively define a buck converter (a step-down chopper circuit). The control circuit 2 includes a switch driver circuit 2a for turning on/off the first switching element Q1, and a feedback circuit 2b that controls the switch driver circuit 2a to maintain a constant voltage across the capacitor C1 (i.e., an output voltage of the lighting power source 1), and also turns on/off the step-up switching element Qb.

The conventional lighting power source 1 shown in FIG. 14 includes a diode D1 and the output circuit interposed between the output end at the low voltage side of the diode bridge DB as the DC power source and a terminal at the low voltage side of the first switching element Q1. Therefore, a driving capacitor Cs, which is connected at one end at the low voltage side of the first switching element Q1 (i.e., between the first switching element Q1 and the diode D1), is provided as the power source for the switch driver circuit 2a of the control circuit 2 to drive the first switching element Q1. Moreover, a charging capacitor Cc is provided as a charging power source that is connected to the other end of the driving capacitor Cs and is supplied with power from the diode bridge DB via a resistor Rc to charge the driving capacitor. More specifically, the voltage at one end at the low voltage side of the first switching element Q1 is approximately equal to the voltage at an output end at the low voltage side of the diode bridge DB during a period in which current flows through a loop defined by the diode D1 and the output circuit, such that the driving capacitor Cs is charged by current supplied from the charging capacitor Cc via the charging diode Dc. Then, the current for charging the driving capacitor Cs flows through a circuit loop including the inductor L1.

The control circuit 2 in FIG. 14 further includes a timer circuit 2c that measures a predetermined charging time after turning the power on, and turns on the step-up switching element Qb by an output via an OR circuit OR1 during the measurement of the charging time. More specifically, the driving capacitor Cs is charged by current flowing via the inductor L1 and the step-up switching element Qb during a period in which the step-up switching element Qb is turned on by way of the above-mentioned operation.

When the driving capacitor Cs, which is not charged when, for example, the power source is just turned on, is charged via a pathway through the inductor L1 as described above, it can be considered that because of the inductor L1, it takes a relatively long time to sufficiently charge the driving capacitor Cs, and it becomes difficult to control the voltage across the driving capacitor Cs.

A technique is further known in the art wherein a switch (not shown) for selectively generating a short circuit across the diode D1 is provided, and the switch is turned on before the control circuit 2 starts turning on/off the first switching element Q1 and during the period in which the voltage across the charging capacitor Cc is below a predetermined value. Because such a configuration can realize the charge via the above-mentioned switch and not through the inductor L1, the voltage across the driving capacitor can become stable in a relatively short time.

Here, the case where PWM control is carried out will be considered. More specifically, the control circuit 2 performs either an operation during an ON period of repeatedly turning on/off the first switching element Q1 to maintain a constant voltage across the capacitor C1, or an operation during an OFF period of keeping the first switching element Q1 in an OFF state, according to an input PWM signal. In this case, the higher a ratio of the ON period in one period (i.e., the higher the on-duty), the more the output power increases.

Conventionally, the switch for causing a short circuit across the diode D1 has been turned on during a period in which the voltage across the charging capacitor Cc is below a predetermined value, i.e., only immediately after turning on the power source (namely, immediately after a DC power source E starts outputting the DC power). Therefore, when the PWM control as described above is carried out, a decrease in voltage across the driving capacitor Cs during the OFF period may make it impossible to turn on the first switching element Q1 when the next ON period starts.

Further known in the art is a technique wherein a switch (not shown) is provided for selectively causing a short circuit across the diode D1, and the above-mentioned switch is turned on before the control circuit 2 starts turning on/off the first switching element Q1 after turning on the power source. More specifically, the charge can be realized via the above-mentioned switch and not through the inductor L1, such that the voltage across the driving capacitor Cs can become stable in a relatively short time.

However, a sudden surge of current immediately after turning on the above-mentioned switch may put an excessive electric stress on circuit components such as the driving capacitor Cs and the charging diode Dc defining the charging pathway for the driving capacitor Cs.

BRIEF SUMMARY OF THE INVENTION

In an aspect of various embodiments of the present invention, a lighting power source and a light fixture are provided that can reduce the time required to stabilize a voltage across a driving capacitor.

In another aspect, a lighting power source and a light fixture are provided that can ensure a voltage across a driving capacitor even in performing an operation according to a PWM signal.

In yet another aspect, a lighting power source and a light fixture are provided that can prevent a current from rapidly and excessively flowing during the initial charging of a driving capacitor.

In an embodiment of the present invention, a lighting power source provides DC power as needed to power an electric light source such as an array of light-emitting diodes (LEDs). A first switching element and a diode are coupled in series across output ends of a DC power source, with a second switching element coupled across the diode. An inductor forms an output loop with the diode. A driving capacitor has a first end coupled to a node between the first switching element and the diode. A charging power source is coupled to a second end of the driving capacitor and is supplied with power from the DC power source. During a charging operation, a control circuit charges the driving capacitor by turning on the second switching element while maintaining the first switching element in an OFF state. During normal operation which follows the charging operation, the control circuit repeatedly turns on/off the first switching element while maintaining the second switching element in the OFF state.

In another embodiment of the present invention, a lighting power source provides DC power as needed to power an electric light source such as an array of light-emitting diodes (LEDs). First and second switching elements are coupled in series across output ends of a DC power source. An output circuit includes an inductor coupled in series with first and second capacitors and across the second switching element. A driving capacitor has a first end coupled to a node between the first and second switching elements. A charging power source is coupled to a second end of the driving capacitor and supplied with power from the DC power source for charging the driving capacitor. A control circuit turns on/off the first and second switching elements using the driving capacitor as a power source, and in accordance with PWM input signals. During a charging operation, the control circuit charges the driving capacitor by turning on the second switching element while maintaining the first switching element in an OFF state. During a normal operation which follows the charging operation the control circuit repeatedly turns on/off the first switching element while maintaining the second switching element in the OFF state. A DC output node is positioned between the inductor and the first capacitor and first and second common nodes are positioned on either end of the second capacitor, wherein DC power is provided with respect to the DC output node and either or both common nodes.

In another embodiment of the present invention, a light fixture includes a fixture housing, a lighting power source and a plurality of output terminals across which in various combinations either DC power or AC power are provided as needed to power an electric power source. The lighting power source includes first and second switching elements coupled in series across output ends of a DC power source. A driving capacitor has a first end coupled to a node between the first and second switching elements. A charging power source is coupled to a second end of the driving capacitor and supplied with power from the DC power source for charging the driving capacitor. A control circuit turns on/off the first and second switching elements using the driving capacitor as a power source in accordance with either of first and second operating modes. During the first (DC output) mode, a charging operation and normal operation are sequentially performed corresponding to an input switching signal, with the charging operation including charging the driving capacitor by turning on the second switching element while maintaining the first switching element in an OFF state, and the normal operation including repeatedly turning on/off the first switching element while maintaining the second switching element in the OFF state. During the second (AC output) mode, the second switching element and the first switching element are alternately turned on/off. The output terminals include first and second common terminals, a DC output terminal, and first and second AC output terminals.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The term "control circuit" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Where the various figures may describe embodiments sharing various common elements and features with other embodiments, similar elements and features are given the same reference numerals and redundant description thereof may be omitted below.

Figure 1:
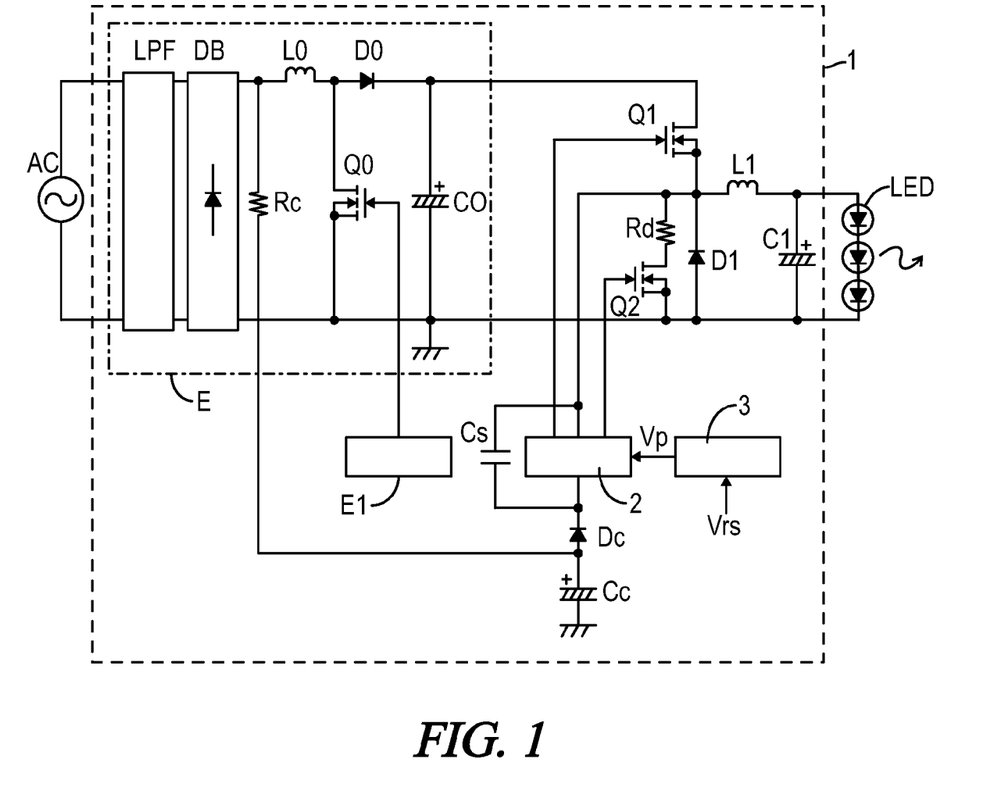
FIG. 1 is a circuit block diagram representing an embodiment of a lighting power source according to the present invention.

Referring to an embodiment as shown in FIG. 1, a lighting power source 1 of the present invention is provided with a DC power source E having an output end at a low voltage side coupled to ground. A first switching element Q1, which may be an N-channel type MOSFET, has its drain coupled to an output end at a high voltage side of the DC power source E. A diode D1 has its cathode coupled to a source of the first switching element Q1 and its anode coupled to ground. An inductor L1 is coupled at a first end to a node between the diode D1 and the first switching element Q1. A capacitor C1 is coupled at a first end to the other end of the inductor L1 and coupled at the other end to ground. A control circuit 2 turns on/off the first switching element Q1 by applying an appropriate voltage to a gate of the first switching element Q1, wherein both ends of the capacitor C1 are coupled to a load (i.e., the light-emitting diode array LED) as output ends. The first switching element Q1, the diode D1, the inductor L1, and the capacitor C1 as shown may collectively form a buck converter. Furthermore, the inductor L1 and the capacitor C1 together may form an output circuit.

The DC power source E is configured with a diode bridge DB that full-wave rectifies AC power input from an AC power source AC via a conventional low-pass filter LPF, and a boost converter that converts a DC output of the diode bridge DB into a DC output with a predetermined voltage. More specifically, a series circuit of an inductor L0 and a switching element Q0 is coupled across output ends of the diode bridge DB, and a series circuit of a diode D0 and a capacitor C0 is coupled in parallel with the switching element Q0. In an embodiment, a power source driving circuit E1 is included for turning on/off the switching element Q0 of the DC power source E. The power source driving circuit E1 may change the on-duty of the switching element Q0 at any time so as to maintain a constant output voltage of the DC power source E. Various exemplary structures for the power source driving circuit E1 are well-known in the art for performing the aforementioned technique, and therefore detailed illustration and explanation will be omitted.

The embodiment as shown also includes a driving capacitor Cs as a power source for the control circuit 2 to drive the first switching element Q1. The driving capacitor Cs is coupled at one end to a source of the first switching element Q1. Moreover, the present embodiment is provided with a charging capacitor Cc as a charging power source for charging the driving capacitor Cs. The charging capacitor Cc may be, for example, an electrolytic capacitor, and may be coupled at one end (the low voltage side) to ground, while coupled at the other end (the high voltage side) via a charging diode Dc to a terminal of the driving capacitor Cs that is not coupled to the first switching element Q1 (i.e., the terminal at the high voltage side). Furthermore, the other end (at the high voltage side) of the charging capacitor Cc is coupled to a DC output end at the high voltage side of the diode bridge DB via a resistor Rc, and the charging capacitor Cc is charged at any time by the output from the diode bridge DB. Instead of coupling the charging capacitor Cc to the DC power source E via the resistor Rc as described above, a configuration may be employed in which current for charging the charging capacitor Cc is generated using, for example, a transformer (not shown). A series circuit of a resistor Rd and a switching element Q2 including an N-channel type MOSFET is coupled in parallel with the diode D1.

During the period in which current is flowing through the inductor L1, the driving capacitor Cs is charged by current flowing through a loop defined by the charging capacitor Cc, the diode Dc, the driving capacitor Cs, the inductor L1, and a parallel circuit including the capacitor C1 and the light-emitting diode array LED.

Furthermore, during the period in which the second switching element Q2 is turned on, the driving capacitor Cs is charged by current flowing through a loop defined by the charging capacitor Cc, the diode Dc, the driving capacitor Cs, and a series circuit including the resistor Rd and the second switching element Q2.

An exemplary operation of the control circuit 2 may now be described. The control circuit 2 receives an input of a PWM signal Vp from a PWM signal generation circuit 3, and operates corresponding to the input PWM signal Vp. The PWM signal Vp is a rectangular waveform having an on-duty of 0 to 1 and switches periodically the signal levels (e.g., the voltage value) between an H level and an L level if the on-duty is neither 0 nor 1. Furthermore, the PWM signal generation circuit 3 receives a reset signal Vrs corresponding to a signal level of either an H level or an L level. During the period in which the reset signal Vrs is at an H level, the signal level of the PWM signal Vp output to the control circuit 2 is fixed to an L level, assuming the above-mentioned on-duty as 0. The on-duty of the PWM signal Vp, which is output by the PWM signal generation circuit 3 during the period in which the reset signal Vrs is at an L level, may be determined, for example, in accordance with a program previously stored in the PWM signal generation circuit 3, or in accordance with an external input.

The relationship between the signal level of the reset signal Vrs and the operation is not expressly limited to that described above. For example, the PWM signal Vp may be fixed at an L level when the reset signal Vrs is at an L level. The reset signal Vrs may also be an external input. The lighting power source 1 may be provided with an abnormality detection circuit (not shown) that detects an abnormality such as a short circuit, an over-current, and/or a no-load condition in which no load is coupled across the capacitor C1, and accordingly outputs a reset signal Vrs. Since various examples of an abnormality detection circuit effective to perform the functions as described above are well-known in the art, detailed illustration and explanation will be omitted.

The output power from the control circuit 2 increases in accordance with increases in the on-duty of the PWM signal Vp (i.e., a ratio of the time of an H level in one period).

Figure 2:
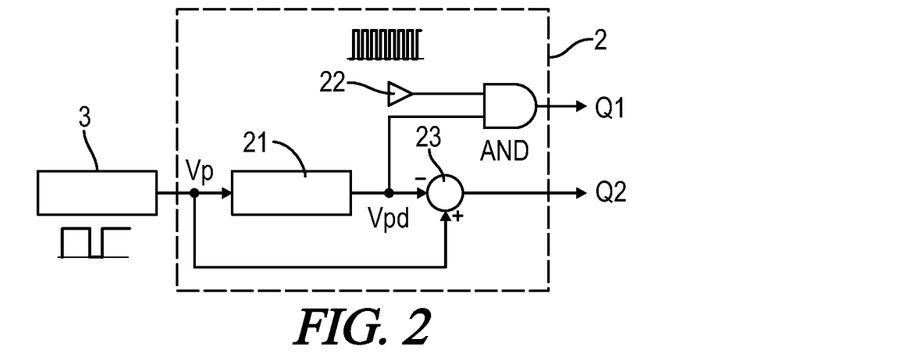
FIG. 2 is a block diagram representing a detailed section of the lighting power source of FIG. 1.

In an embodiment as represented in FIG. 2, the control circuit 2 includes a delay circuit 21 for outputting a delay signal Vpd that is the input PWM signal Vp delayed for a predetermined delay time td, an oscillation circuit 22 for generating a drive signal that is a rectangular wave with a sufficiently high frequency to a frequency of the PWM signal Vp, and an AND circuit (AND) that calculates a logical product between the delay signal Vpd output from the delay circuit 21 and the output from the oscillation circuit 22. The first switching element Q1 may be turned on during the period in which the output of the AND circuit AND is at an H level, whereas the first switching element Q1 is turned off in the period in which the output of the AND circuit AND is at an L level. In other words, the period in which the delay signal Vpd is at an H level is regarded as the period (hereinafter referred to as an "ON-period") in which the operation (hereinafter referred to as a "normal operation") of periodically turning on/off the first switching element Q1 at the frequency of the drive signal. Furthermore, the period in which the delay signal Vpd is at an L level is regarded as a period in which the first switching element Q1 is kept in the OFF state (hereinafter referred to as an "OFF period"). The ratio of the ON-period Ton to the total of the ON-period Ton and the OFF period Toff as described above corresponds to the on-duty of the PWM signal Vp.

The control circuit 2 may further as shown in FIG. 2 also be provided with a subtraction circuit 23 that generates the output for driving the second switching element Q2 by subtracting the delay signal Vpd from the input PWM signal Vp, as well as equalizing negative parts to an L level. More specifically, the period during which the second switching element Q2 is turned on is the period in which the output from the subtraction circuit 23 is at an H level, whereas the period during which the second switching element Q2 is turned off is the period in which the output from the subtraction circuit 23 is at an L level.

Figure 3:
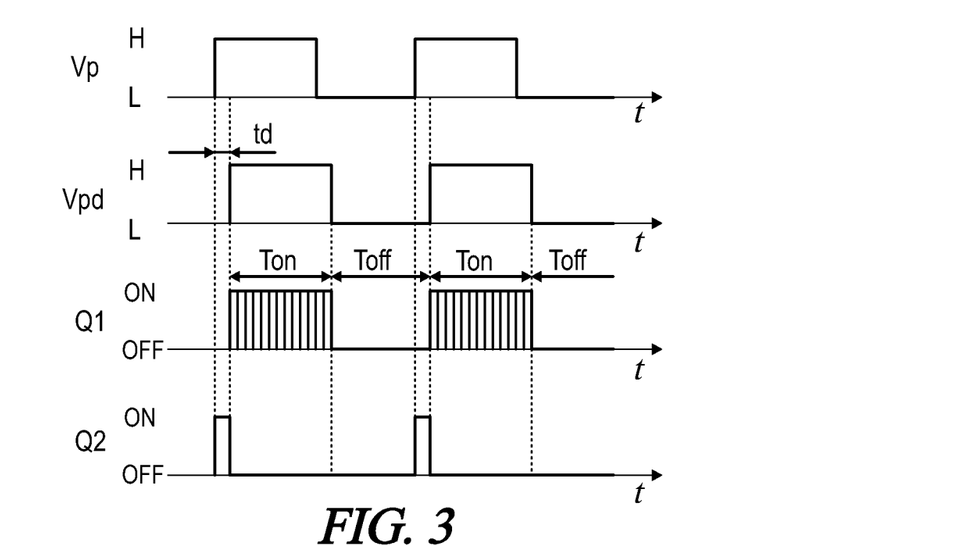
FIG. 3 is a graphical diagram representing an exemplary operation of the lighting power source of FIG. 1 when on-duty of a PWM signal is approximately 0.5.

Accordingly, as represented for example in FIG. 3, the charging operation may be carried out once for each ON-period Ton, in which the driving capacitor Cs is charged by turning on the second switching element Q2 while keeping the first switching element Q1 in the OFF state over the delay time td immediately before starting the ON-period Ton.

Figure 4:
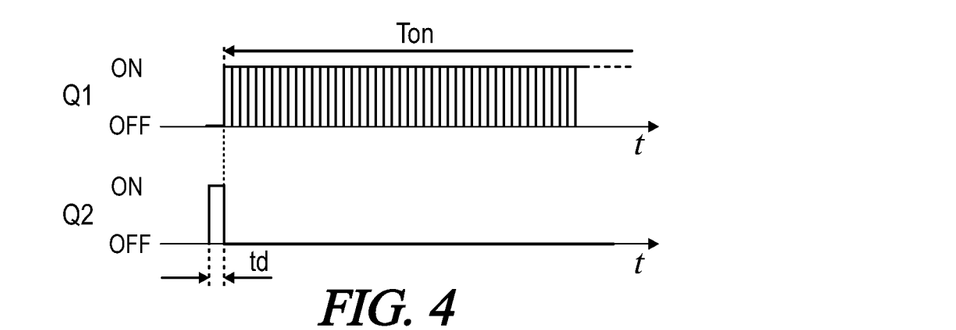
FIG. 4 is a graphical diagram representing an exemplary operation of the lighting power source of FIG. 1 when the on-duty of the PWM signal is 1.

Moreover, in an example as shown in FIG. 4 when the on-duty of the PWM signal Vp is continuously 1 (one) after the power source is turned on and the DC power source E outputs DC power, the second switching element Q2 is turned on only during the delay time td immediately after the power source is turned on while the first switching element Q1 is turned off. The normal operation continues in which the first switching Q1 is repeatedly turned on and off while maintaining the second switching element Q2 in the OFF state.

According to the configuration described above, a peak value of the charging current when the second switching element Q2 is turned on to start charging the driving capacitor Cs may be limited by the resistor Rd as a so-called current-limiting resistor.

When, for example, abnormalities are detected and controlled based on current flowing to the second switching element Q2, the voltage across the resistor Rd can be used to detect the current flowing to the second switching element Q2.

Moreover, because the charging operation is carried out for each ON-period Ton, the first switching element Q1 can be reliably turned on with the start of the ON-period Ton even if the voltage of the driving capacitor Cs decreases during the OFF period Toff.

The diode D1 is further provided separately from the second switching element Q2, and is coupled in parallel with the series circuit of the second switching element Q2 and the resistor Rd. Therefore, any loss due to the resistor Rd is not generated in the period in which the second switching element Q2 is turned off.

Figure 5:
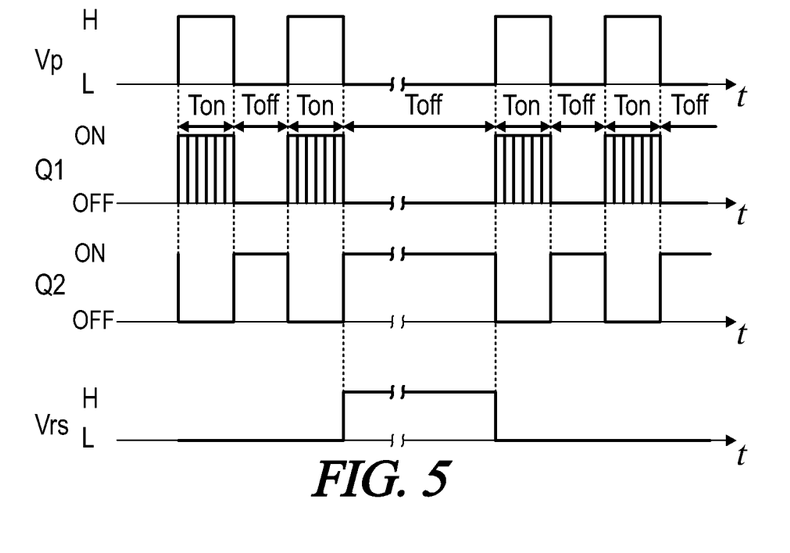
FIG. 5 is a graphical diagram representing a modified example of the operations of FIGS. 3 and 4.

In an embodiment as shown in FIG. 5, instead of using the delay circuit 21, the control circuit 2 may set the period in which the PWM signal Vp is at an H level as the ON-period Ton, set the period in which the PWM signal Vp is at an L level as the OFF period Toff, and turn on the second switching element Q2 all the time during the OFF period Toff (i.e., carry out the charging operation). In this case, a separate control is required to ensure that the charging operation is carried out even if the PWM signal Vp is at an H level immediately after the power source is turned on and the DC power source E starts outputting the DC power. An output for driving the second switching element Q2 as described above can be generated using, for example, a conventional NOT circuit (not shown) that is effective to calculate the negation of the PWM signal Vp, detailed illustration and explanation of which may be omitted.

Figure 6:
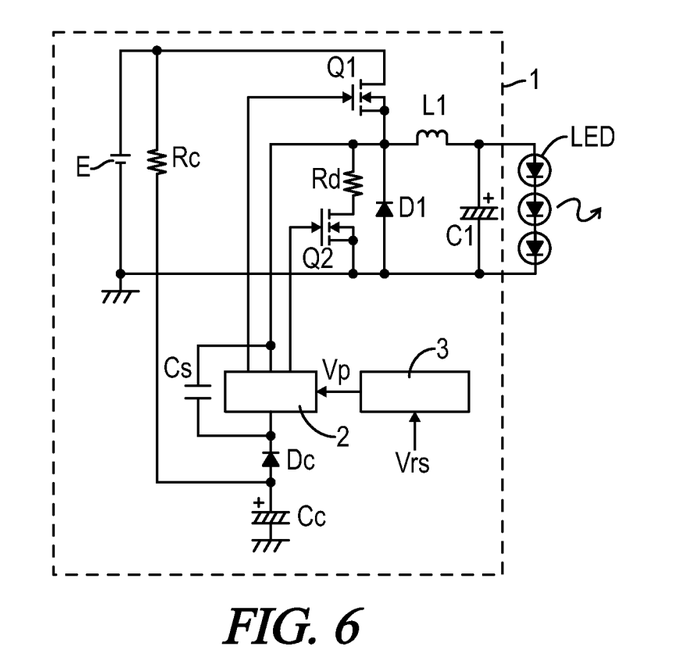
FIG. 6 is a circuit block diagram representing a modified example of the lighting power source of FIG. 1.

The DC power source E is not expressly limited to the boost converter configuration as described above, but a battery or other well-known DC power source may be used as shown for example in FIG. 6.

Furthermore, the charging operation may be carried out intermittently more than once for each ON-period. Employing such a configuration can further reduce or prevent electrical stresses.

Figure 7:
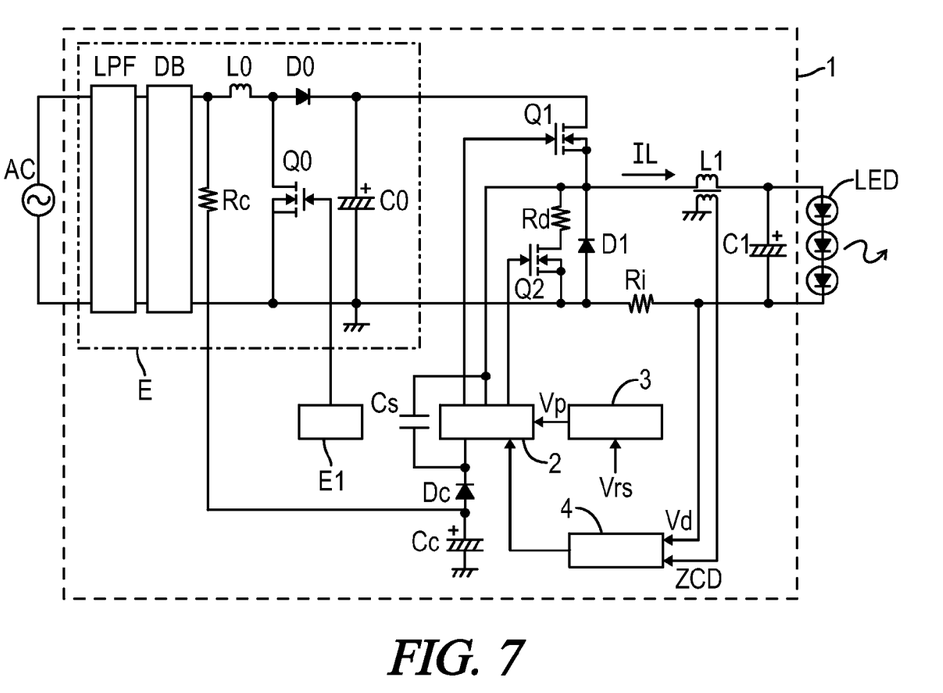
FIG. 7 is a circuit block diagram representing another embodiment of a lighting power source in accordance with the present invention.

In an embodiment as shown in FIG. 7, the timing for turning on/off the first switching element Q1 during the ON-period Ton is determined based on a current (hereinafter referred to as a "circuit current") IL flowing to the inductor L1 that constitutes the output circuit, instead of being determined based on the output from the oscillation circuit 22 as previously described.

More specifically, a timing circuit 4 may be provided for generating and providing a drive signal input to the control circuit 2, instead of the oscillation circuit 22 as described with reference to FIG. 2. Furthermore, the inductor L1 is provided with a secondary winding having one end at a higher voltage side which when the circuit current IL increases is coupled to the timing circuit 4, and the other end being coupled to ground. A current detection resistor Ri effective to detect the circuit current IL is coupled between the capacitor C1 and the diode D1. More specifically, the voltage (hereinafter referred to as a "detection voltage") Vd at a node between the current detection resistor Ri and the capacitor C1 is proportional to the circuit current IL, and the detection voltage Vd is input to the timing circuit 4.

Figure 8:
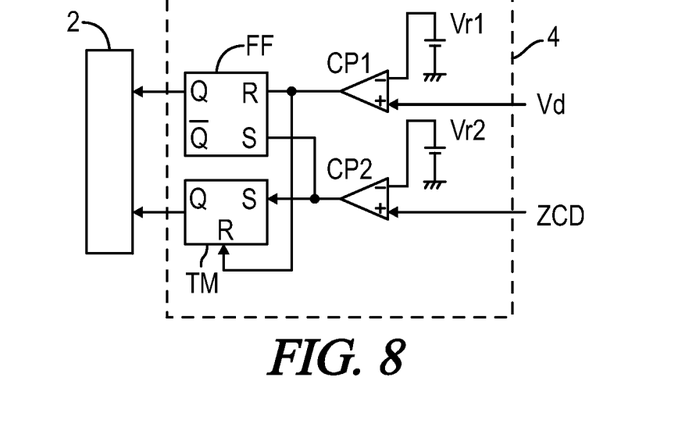
FIG. 8 is a circuit block diagram representing a detailed section of the lighting power source of FIG. 7.

As shown in FIG. 8, the timing circuit 4 may be provided with a first comparator CP1 whose inverting input terminal receives a predetermined first reference voltage Vr1 input thereto as well as whose non-inverting input terminal receives the detection voltage Vd input thereto, a second comparator CP2 whose inverting input terminal receives a predetermined second reference voltage Vr2 input thereto as well as whose non-inverting input terminal receives a voltage (hereinafter referred to as an "induced voltage") ZCD that is induced by the secondary winding of the inductor L1 input thereto, and an RS-type flip-flop circuit FF whose reset terminal R is coupled to the output end of the first comparator CP1 as well as whose set terminal S is coupled to the output end of the second comparator CP2. An output end Q of the flip-flop circuit FF is an output end for outputting a drive signal.

Figure 9:
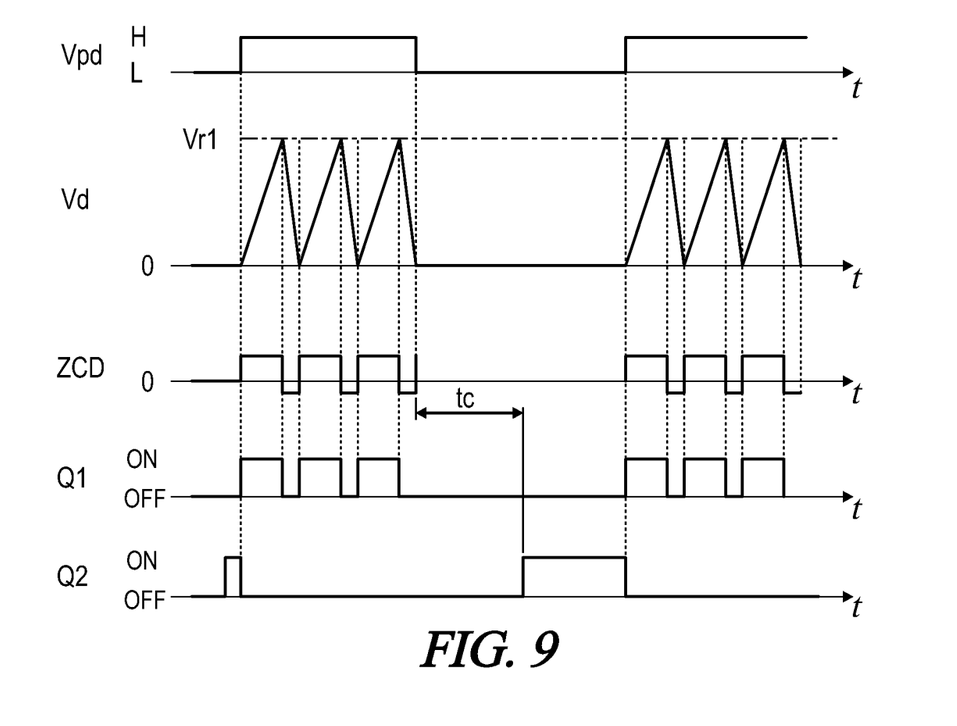
FIG. 9 is a graphical diagram representing an exemplary operation of the lighting power source of FIG. 7.

Referring to an exemplary operation as shown in FIG. 9, turning off the first switching element Q1 gradually increases the circuit current IL, thereby gradually increasing the detection voltage Vd. When the detection voltage Vd finally reaches the first reference voltage Vr1, the first switching element Q1 is turned off. Then, the circuit current IL starts decreasing, and when the circuit current IL reaches zero the induced voltage ZCD rises and exceeds the second reference voltage Vr2, thereby detecting the zero cross of the circuit current IL. The input voltage from the second comparator CP2 to the set terminal S of the flip-flop circuit FF thus reaches an H level. The first switching element Q1 is then turned on again, and the same operations are repeated thereafter.

More specifically, the second comparator CP2 is the zero cross detection means, and a predetermined upper limit value of the current value is a value obtained by dividing the first reference voltage Vr1 by a resistance value of the current detection resistor Ri. In addition, particularly with regards to the starting of the ON-period Ton, the control to turn on the first switching element Q1 is carried out after the charging operation not in response to the zero cross detection as described above, but in response to the rise of the delay signal Vpd.

The timing circuit 4 may also include a zero cross timer TM that measures the elapsed time since last detection of the zero cross (i.e., since the output of the second comparator CP2 reaches an H level). The zero cross timer TM includes a start terminal S coupled to the output terminal of the second comparator CP2, a reset terminal R coupled to the output terminal of the first comparator CP1, and an output end F coupled to the control circuit 2. The zero cross timer TM generally gives an output to the control circuit 2 at an L level, and starts measuring a predetermined standby time tc when the induced voltage ZCD rises and the output of the second comparator CP2 reaches an H level. The zero cross timer TM also resets the measured time when the output of the first comparator CP1 reaches an H level during the measurement of the standby time tc, and then starts measuring the time from 0 again when the output of the second comparator CP2 reaches an H level. The zero cross timer TM then gives the output to the control circuit 2 at an H level when completing the measurement of the standby time tc without the output of the first comparator CP1 reaching an H level. The control circuit 2 carries out the charging operation in which the second switching element Q2 is turned on and the first switching element Q1 maintained in the OFF state while the output of the zero cross timer is at an H level. Therefore, for example, when the circuit current IL does not flow due to for example removal of the load (e.g., the light-emitting diode array LED), the charging operation is carried out irrespective of the PWM signal Vp.

In an exemplary operation as represented in FIG. 9, a decrease in the circuit current IL to 0 causes a rise in the induced voltage ZCD even when the delay signal Vpd reaches an L level. In this case, however, the on-control of the first switching element Q1 is not carried out because the delay signal Vpd is at an L level. The output of the zero cross timer returns to an L level when the delay signal Vpd reaches an H level, for example.

In certain cases the resistor Rd that is coupled in series with the second switching element Q2 may be used for current detection instead of the resistor Ri as described above. However, when the diode D1 is separately provided, as described herein with respect to various embodiments, as a free-wheeling diode without using a parasitic body diode of the second switching element Q2, it is preferable in terms of precision to provide the current detection resistor Ri separately from the above-mentioned resistor Rd.

Figure 10:
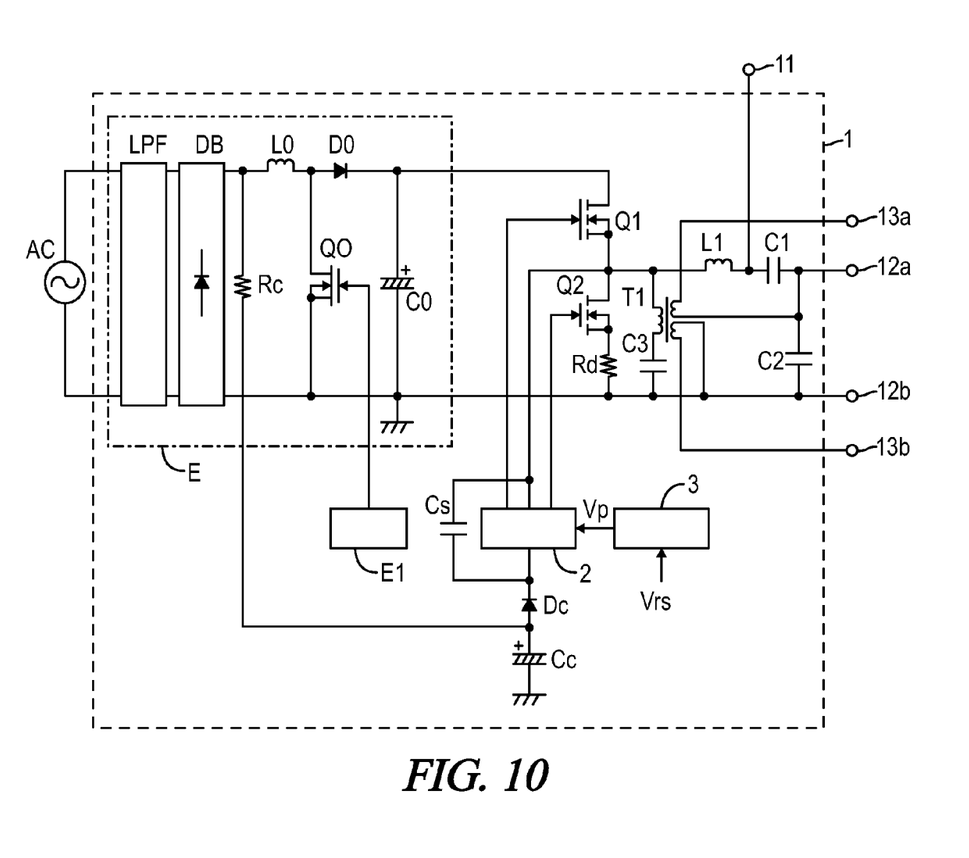
FIG. 10 is a circuit block diagram representing another embodiment of a lighting power source in accordance with the present invention.

In certain embodiments such as that represented in FIG. 10, the diode D1 is omitted and a parasitic body diode of the second switching element Q2 serves as a free-wheeling diode. Omission of the diode D1 as described above can be implemented also in various embodiments such as those represented in previously described circuits, or alternatively a separate diode D1 may be provided in the embodiment represented in FIG. 10.

Figure 11A:
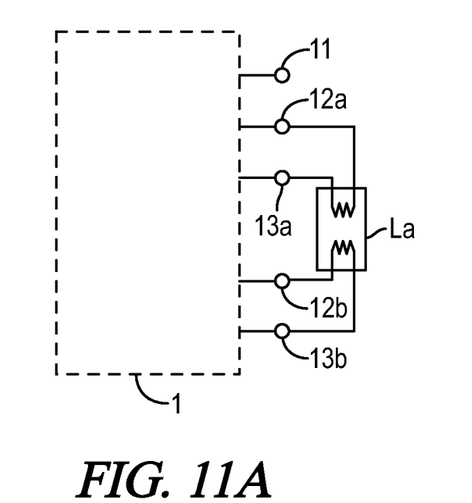
FIG. 11A is an explanatory view representing a lamp connection configuration for the embodiment of FIG. 10, wherein a discharge lamp La is connected as a light source.
Figure 11B:
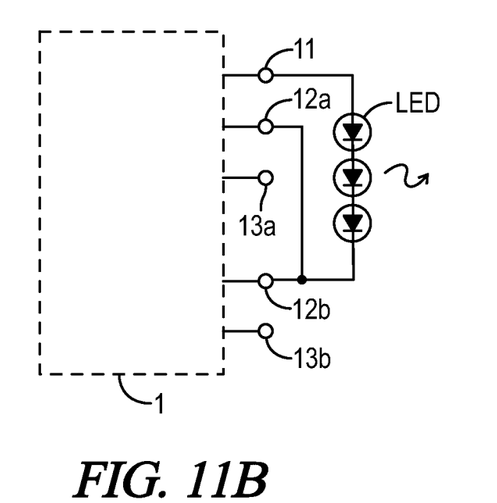
FIG. 11B is an explanatory view representing a connection configuration to the embodiment of FIG. 10, wherein a light-emitting diode array LED is connected as a light source.

Referring again to FIG. 10, the control circuit 2 switches the operating mode corresponding to the input switching signal. Switching the operating mode via the control circuit 2 makes it possible to output DC power for lighting a light-emitting diode array LED (FIG. 11B), as well to output AC power for lighting a discharge lamp La as shown in FIG. 11A. The switching signal described above may be an external input with respect to the lighting power source 1, or a switching circuit (not shown) may be provided that inputs a switching signal to the control circuit 2 in response to a manual input by a user or based upon detection of an impedance with respect to terminals 11, 12a, 12b, 13a and/or 13b as described below. Various configurations for the switching circuit as described above are well-known in the art and therefore detailed illustration and explanation will be omitted.

As described above, it is possible to selectively connect one of a hot-cathode discharge lamp La that has a pair of filaments and receives an AC power input, or a light-emitting diode array LED driven by DC power.

With reference to FIG. 10, a terminal (hereinafter referred to as a "DC terminal") 11 that may be coupled to an anode side of the light-emitting diode array LED is provided between the inductor L1 and a capacitor (hereinafter referred to as a "first capacitor") C1. Moreover, a second capacitor C2 is added between the first capacitor C1 and the ground. Terminals (hereinafter referred to as "common terminals") 12a and 12b may be respectively coupled to one end of each filament of the discharge lamp La, or alternatively to a cathode of the light-emitting diode array LED, are provided at either end of the second capacitor C2. More specifically, the common terminals 12a and 12b establish a short circuit with each other with the light-emitting diode array LED connected thereto. Such a short circuit may be established for example by a load itself such as the light-emitting diode array LED as described above, or a switching element (not shown) that is controlled to turn on during a first operating mode as described below and to turn off during a second operating mode as described below may be provided between the common terminals 12a and 12b.

In an embodiment, a transformer T1 that has a primary winding with one end coupled to a node between switching elements Q1 and Q2 and the other end coupled to ground via a third capacitor C3 may be provided for preheating each filament of the discharge lamp La. The transformer T1 has two secondary windings each having one end coupled to one of the common terminals 12a and 12b. Two AC output terminals 13a and 13b are provided, each of which is coupled to the other end of each respective secondary winding as well as to the other end of each filament of the discharge lamp La (i.e., an end at the side not coupled to either of the common terminals 12a, 12b).

An exemplary operation of the control circuit 2 in an embodiment as shown in FIG. 10 may be described below.

Because the operation of the first operating mode (during the period in which the switching signal provides instructions regarding the output of the DC power) may be carried out by means of any one or more operations as previously described with respect to various embodiments, further explanation thereof will be omitted here. During this period, DC power is output from the terminals 11, 12a and 12b across the first capacitor C1.

In the second operating mode (carried out in the period during which the switching signal provides instructions regarding the output of the AC power), the control circuit 2 alternately turns on and off the first switching element Q1 and the second switching element Q2 is turned on and off alternately. More specifically, the first and second switching elements Q1 and Q2, the inductor L1 and the first and second capacitors C1 and C2 operate as a well-known half-bridge inverter to output AC power across terminals 12a and 13a each respectively coupled to opposing ends of a first filament of the discharge lamp La and the terminals 12b and 13b each respectively coupled to opposing ends of the other filament. Furthermore, each filament of the discharge lamp La is preheated respectively at startup by the current induced by each secondary winding of the transformer T1. In the second operating mode as described above, the power output to the discharge lamp La varies according to a relationship between the resonance frequency of a resonant circuit including the inductor L1, the first and second capacitor C1 and C2 and the discharge lamp La, and a frequency (hereinafter referred to as an "operating frequency") for the control circuit 2 to alternately turn on and off the first and second switching elements Q1 and Q2. A feedback control may then be carried out in which the control circuit 2 detects the output power to the discharge lamp La based on the voltage across the resistor Rd, and changes the operating frequency at any time to set the output power to the discharge lamp La to be a predetermined desired value.

In various embodiments, the second switching element Q2 may be configured as an integrated circuit on a single chip along with the control circuit 2, and other elements may also be integrated. The elements to be integrated along with the control circuit 2 may include for example, in addition to the second switching element Q2, the resistor Rd connected in series with the second switching element Q2, and the diode Dc interposed between the charging capacitor Cc and the driving capacitor Cs. The driving capacitor Cs may also be integrated within the scope of the present invention. An appropriate integration as described above enables reduction of the number of components and accordingly a minimization in size. Furthermore, when the second switching element Q2 is integrated, the number of terminals that are connected to the gate of the second switching element Q2 can be reduced in the integrated circuit constituting the control circuit 2, compared to the case where the integrated circuit constitutes only the control circuit 2. In this case, the second switching element Q2 can be formed in a DMOS (Double-Diffused MOSFET) structure using a well-known technique called a high-voltage resistant process.

In addition, even when a P-channel type MOSFET is used as the first switching element Q1 instead of the N-channel type MOSFET as described above, the driving capacitor Cs as described above may be required in the case where the circuit configuration includes the diode D1. In this case, the parasitic diode of the first switching element Q1 is also oriented opposite to the output from the DC power source E, so that the drain of the first switching element Q1 is coupled to the DC power source E and the source thereof is coupled to the diode D1.

Figure 12:
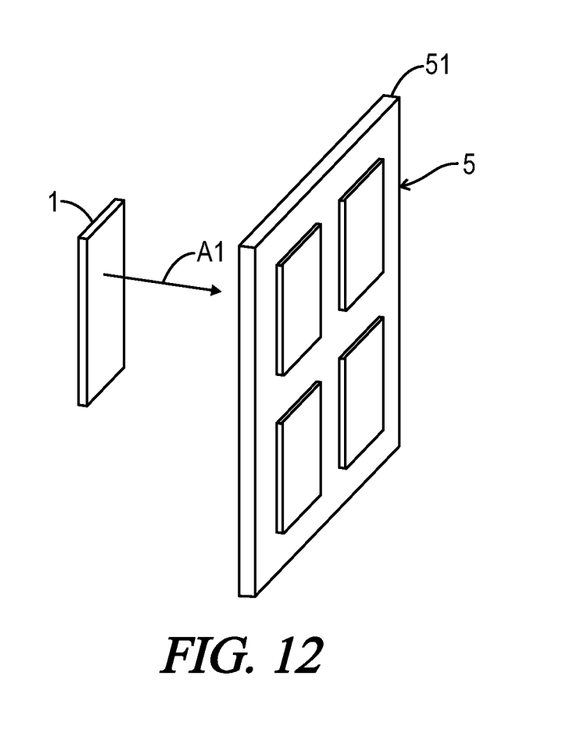
FIG. 12 is an exploded perspective view representing an example of a light fixture incorporating a lighting power source of the present invention.
Figure 13:
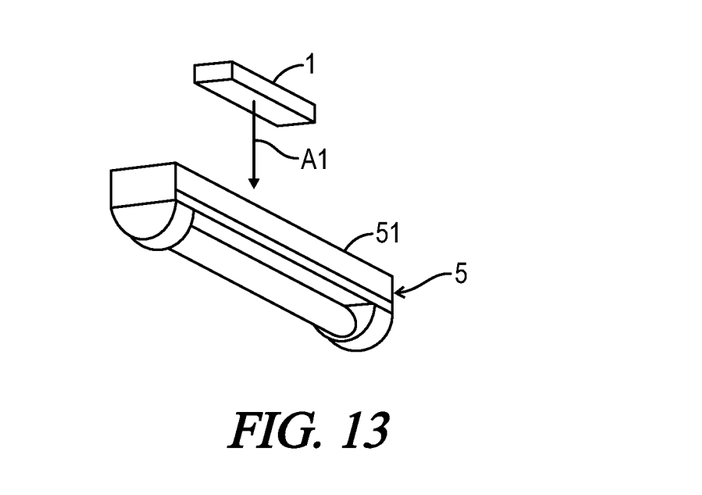
FIG. 13 is an exploded perspective view representing another example of a light fixture incorporating a lighting power source of the present invention.

Various embodiments of lighting power sources 1 in accordance with the present invention can be mounted in a fixture housing 51 such as shown in FIGS. 12 and 13 in a manner represented for example by the arrow A1 to constitute a light fixture 5. The fixture housing 51 holds an electric light source, such as the light-emitting diode array LED and the discharge lamp La, coupled to the lighting power source 1 as appropriate with respect to the form of the electric light source. Because the fixture housing 51 as described above may include various structures are well-known in the art, detailed illustration and explanation herein will be omitted. In addition, other alternative well-known electric light sources that receive DC power, such as for example an organic EL, may be used instead of the light-emitting diode array LED.

Thus, although there have been described particular embodiments of the present invention of a new and useful Lighting Power Source with Controlled Charging Operation for a Driving Capacitor, it is not intended that such references be construed as limitations upon the scope of this invention except as set forth in the following claims.

What is claimed is:

1. A lighting power source comprising:
a DC power source;
a first switching element and a diode coupled in series across output ends of the DC power source;
an output circuit comprising an inductor and forming a loop along with the diode;
a driving capacitor having a first end coupled to a node between the first switching element and the diode;
a charging power source coupled to a second end of the driving capacitor, the charging power source being supplied with power from the DC power source and charging the driving capacitor;
a second switching element coupled across the diode; and
a control circuit effective to turn on/off the first and second switching elements using the driving capacitor as a power source, wherein during a charging operation, the control circuit charges the driving capacitor by turning on the second switching element while maintaining the first switching element in an OFF state, and during a normal operation which follows the charging operation, the control circuit repeatedly turns on/off the first switching element while maintaining the second switching element in an OFF state.

2. The lighting power source of claim 1, further comprising a PWM circuit for providing a PWM signal having either a first signal level or a second signal level to the control circuit, the control circuit effective upon detecting a change in the PWM signal level from the first level to the second level to perform the charging operation for a predetermined delay time period and then start the normal operation, and the PWM circuit effective to keep the PWM signal level at the first level during a period in which an input reset signal is at a predetermined level.

3. The lighting power source of claim 2, further comprising:

a zero-cross detection circuit effective to detect a zero-cross of a current flowing through the inductor of the output circuit;

a current detection circuit effective to detect the current flowing through the inductor of the output circuit;

the control circuit is further effective in the normal operation to turn on the first switching element upon detection of a zero-cross by the zero-cross detection circuit, and to turn off the first switching element when the current detected by the current detection circuit reaches a predetermined upper limit value; and the control circuit is further effective to initiate the charging operation when the current detected by the current detection circuit does not reach the predetermined upper limit value prior to a lapse of a predetermined time from detection of zero-cross by the zero-cross detection circuit.

4. The lighting power source of claim 3, wherein a resistor and the second switching element are coupled in series across the diode.

5. The lighting power source of claim 4, wherein the output circuit comprises a capacitor coupled in series with the inductor across the diode.

6. The lighting power source of claim 4, wherein the output circuit comprises two capacitors coupled in series with the inductor across the diode, and the control circuit is effective to operate in either of a first operating mode in which the charging operation and the normal operation are performed corresponding to an input switching signal, and a second operating mode in which the second switching element and the first switching element are alternately turned on/off.

7. The lighting power source of claim 1, wherein the control circuit and the second switching element collectively reside on an integrated circuit.

8. A lighting power source comprising:

a DC power source;

first and second switching elements coupled in series across output ends of the DC power source;

an output circuit comprising an inductor coupled in series with first and second capacitors and across the second switching element;

a driving capacitor having a first end coupled to a node between the first and second switching elements;

a charging power source coupled to a second end of the driving capacitor, the charging power source being supplied with power from the DC power source and charging the driving capacitor;

a control circuit effective to turn on/off the first and second switching elements using the driving capacitor as a power source, wherein during a charging operation, the control circuit charges the driving capacitor by turning on the second switching element while maintaining the first switching element in an OFF state, and during a normal operation which follows the charging operation, the control circuit repeatedly turns on/off the first switching element while maintaining the second switching element in the OFF state; and a DC output node between the inductor and the first capacitor and first and second common nodes on either end of the second capacitor, wherein DC power effective to power an electric light source is provided with respect to the DC output node and either or both common nodes.

9. The lighting power source of claim 8, wherein the control circuit is effective to operate in either of a first operating mode in which the charging operation and the normal operation are performed corresponding to an input switching signal, and a second operating mode in which the second switching element and the first switching element are alternately turned on/off.

10. The lighting power source of claim 9, further comprising:

a first winding of a transformer and a third capacitor are coupled in series across the second switching element and further in parallel with the output circuit;

a second winding of the transformer is coupled on a first end to a first AC power output and on a second end to the first common node; and a third winding of the transformer is coupled on a first end to a second AC power output and on a second end to the second common node.

11. The lighting power source of claim 10, wherein DC power effective to power an electric light source is provided with respect to the DC output node and either or both common nodes during said first operating mode, further wherein AC power is provided across the first AC output node and the first common node and across the second AC output node and the second common node during said second operating mode.

12. The lighting power source of claim 8, further comprising:

a PWM circuit for providing a PWM signal having either a first signal level or a second signal level to the control circuit;

the control circuit is effective upon detecting a change in the PWM signal level from the first level to the second level to perform the charging operation for a predetermined delay time period and then start the normal operation; and the PWM circuit is effective to keep the PWM signal level at the first level during a period in which an input reset signal is at a predetermined level.

13. The lighting power source of claim 12, further comprising:

a zero-cross detection circuit effective to detect a zero-cross of a current flowing through the inductor of the output circuit;

a current detection circuit effective to detect the current flowing through the inductor of the output circuit;

the control circuit is effective in the normal operation to turn on the first switching element upon detection of a zero-cross by the zero-cross detection circuit, and to turn off the first switching element when the current detected by the current detection circuit reaches a predetermined upper limit value; and the control circuit is effective to initiate the charging operation when the current detected by the current detection circuit does not reach the predetermined upper limit value prior to a lapse of a predetermined time from detection of zero-cross by the zero-cross detection circuit.

14. The lighting power source of claim 13, wherein the second switching element is coupled to ground via a resistor.

15. The lighting power source of claim 8, wherein the control circuit and the second switching element collectively reside on an integrated circuit.

16. A light fixture comprising:
a fixture housing;
a lighting power source mounted to said fixture housing and comprising
a DC power source;
first and second switching elements coupled in series across output ends of the DC power source;
a driving capacitor having a first end coupled to a node between the first and second switching elements;
a charging power source coupled to a second end of the driving capacitor, the charging power source being supplied with power from the DC power source and charging the driving capacitor;
a control circuit effective to turn on/off the first and second switching elements using the driving capacitor as a power source in accordance with either of
a first operating mode in which a charging operation and a normal operation are sequentially performed corresponding to an input switching signal, said charging operation comprising charging the driving capacitor by turning on the second switching element while maintaining the first switching element in an OFF state, and said normal operation comprising repeatedly turning on/off the first switching element while maintaining the second switching element in the OFF state, and
a second operating mode in which the second switching element and the first switching element are alternately turned on/off;
first and second common terminals;
a DC output terminal, the lighting power source effective during the first operating mode to generate DC power across the DC output terminal and either or both of the common terminals; and
first and second AC output terminals, the lighting power source effective during the second operating mode to generate AC power across the first AC output node and the first common node and across the second AC output node and the second common node.

17. The light fixture of claim 16, the lighting power source further comprising
an output circuit comprising an inductor coupled in series with first and second capacitors and across the second switching element;
a first winding of a transformer and a third capacitor coupled in series across the second switching element and further in parallel with the output circuit;
a second winding of the transformer coupled on a first end to the first AC output terminal and on a second end to the first common terminal; and
a third winding of the transformer coupled on a first end to a second AC output terminal and on a second end to the second common terminal,
the DC output terminal coupled to a node between the inductor and the first capacitor.

18. The light fixture of claim 17, the lighting power source further comprising a PWM circuit for providing a PWM signal having either a first signal level or a second signal level to the control circuit,
the control circuit is effective upon detecting a change in the PWM signal level from the first level to the second level to perform the charging operation for a predetermined delay time period and then start the normal operation, and
the PWM circuit is effective to keep the PWM signal level at the first level during a period in which an input reset signal is at a predetermined level.

19. The light fixture of claim 18, the lighting power source further comprising:
a zero-cross detection circuit effective to detect a zero-cross of a current flowing through the inductor of the output circuit; and
a current detection circuit effective to detect the current flowing through the inductor of the output circuit,
the control circuit is effective in the normal operation to turn on the first switching element upon detection of a zero-cross by the zero-cross detection circuit, and to turn off the first switching element when the current detected by the current detection circuit reaches a predetermined upper limit value,
the control circuit is effective to initiate the charging operation when the current detected by the current detection circuit does not reach the predetermined upper limit value prior to a lapse of a predetermined time from detection of zero-cross by the zero-cross detection circuit.

20. The light fixture of claim 16, the lighting power source comprising a diode coupled in parallel with the second switching element and an output circuit comprising an inductor and a capacitor coupled on a first end to the cathode of the diode and forming a loop including the diode.

* * * * *